United States Patent [19]

Sakama et al.

[11] Patent Number: 4,912,747
[45] Date of Patent: Mar. 27, 1990

[54] INTERLOCK DEVICE FOR ELECTRICAL EQUIPMENT

[75] Inventors: Satoru Sakama, Isehara; Asami Nemoto, Odawara, both of Japan

[73] Assignee: NCR Corporation, Dayton, Ohio

[21] Appl. No.: 316,267

[22] Filed: Feb. 27, 1989

[30] Foreign Application Priority Data

Mar. 25, 1988 [JP] Japan .................................. 63-69964

[51] Int. Cl.$^4$ .......................... H02B 1/18; H01H 9/20
[52] U.S. Cl. .................................... 361/331; 312/223; 439/136
[58] Field of Search ............. 200/50 A, 50 AA, 50 B, 200/50 R; 361/345, 344; 439/135, 136, 142, 143, 144, 145; 312/223

[56] References Cited

U.S. PATENT DOCUMENTS 3,141,713   7/1964   Kauffman ....................... 439/142 X Primary Examiner—J. R. Scott
Attorney, Agent, or Firm—Wilbert Hawk, Jr.; Albert L. Sessler, Jr.; George J. Muckenthaler

[57] ABSTRACT

An interlock device includes a shutter member disposed between a socket and a plug. The shutter member is coupled by a lost motion connection to the cover and movable therewith from a closed cover position allowing the plug to be inserted through an opening in the shutter member and into the socket to an open cover position preventing insertion of the plug through the opening and into the socket. The shutter member also prevents opening the cover when the plug is inserted into the socket.

12 Claims, 2 Drawing Sheets

INTERLOCK DEVICE FOR ELECTRICAL EQUIPMENT

BACKGROUND OF THE INVENTION

In the field of business machines, there are areas of such machines which are arranged so as not to be accessible to the operator under certain operating conditions. One of the areas of such machines is in a higher voltage area so that the operator is protected from accidentally coming into contact with such higher voltage.

In the case of a socket or like receptacle for receiving a power source such as a plug or the like, it is known that a slidable member or shutter is provided to cover the socket or receptacle. In this regard, the plug cannot be inserted into the socket when such socket is covered and an effort must be made on the part of the operator to uncover the socket in order to insert the plug.

In the known arrangement, the structure has a disadvantage in that a power source plug cannot be inserted into a socket until the slidable member or shutter is moved and it may be difficult for the operator to move the shutter and also to insert the power source plug at the same time. Additionally, the slidable member or shutter protrudes in front of the socket to prevent insertion of the plug and if the socket is not entirely uncovered, the slidable member or shutter may be damaged by forcing the plug into the socket.

Representative documentation in the field of interlock devices includes U.S. Pat. No. 1,620,814, issued to B. E. Getchell on Mar. 15, 1927, which discloses an electric safety switch wherein a fuse box has a cover with an opening that is closed by a slide. The slide has a flange positioned between a switch handle and an edge of the cover so as to prevent the slide from being opened when the switch is closed.

U.S. Pat. No. 2,752,413, issued to A. H. Junkins on June 26, 1956, discloses an electrical interlock for coupling elements and is swingable from a closed to an open position. The interlock has an aperture for receiving one coupling element when the interlock is in the closed position.

U.S. Pat. No. 3,068,442, issued to J. T. Kubik et al. on Dec. 11, 1962, discloses a safety guard for wall sockets that includes a single control for covering one or both of the socket openings.

U.S. Pat. No. 3,147,056, issued to H. Mendelson on Sept. 1, 1964, discloses a protective interlock structure that includes a panel movable to cover an opening in a wall and which positions a cutout in the panel for receiving an electrical connector member, and movable to uncover the opening to prevent connection of two members.

U.S. Pat. No. 3,213,222, issued to J. D. Finley et al. on Oct. 19, 1965, discloses a switchgear shutter that includes a main shutter and an auxiliary shutter for closing openings in an upper row of openings and thereby preventing communication between front and rear compartments.

U.S. Pat. No. 3,660,798, issued to C. C. Marzec on May 2, 1972, discloses a mechanical interlock device having an L-shaped slide member movable between one position effective to prevent insertion of an electric plug into a socket and another position wherein it is ineffective to prevent such insertion.

And, U.S. Pat. No. 4,565,908, issued to F. Bould on Jan. 21, 1986, discloses drawout switchgear apparatus with retractable shutter mechanism, obstruction means retractably mounted for preventing movement of the shutter mechanism when the switchgear is removed from its cell, and trigger means for retracting the obstruction means when the switchgear is moved into the cell.

SUMMARY OF THE INVENTION

The present invention is directed to an interlock device for a business machine wherein the device is constructed such that a cover cannot be opened unless a power source plug is removed from the device. Also, the power source plug cannot be inserted into the device unless the cover is closed.

In accordance with the present invention, there is provided an interlock device comprising a cover for a cabinet, a socket supported from or within the cabinet and adapted to receive a power source plug, and a shutter member which is slidable relative to the socket so as to allow or to prevent access thereto, the shutter member having an element fixed thereto and including a lost motion connection operably associated with the cover, the shutter member being constructed to move in one direction when the cover is closed to allow the plug to be inserted into the socket and to move in the opposite direction when the cover is open to prevent insertion of the plug into the socket, and the plug being constructed to engage with the shutter member to prevent opening of the cover when the plug is inserted into the socket.

In view of the above discussion, a principal object of the present invention is to provide an interlock device for a business machine.

Another object of the present invention is to provide an interlock device which is effective upon opening and closing of the cover for the cabinet of a business machine.

An additional object of the present invention is to provide an interlock device which permits a power source plug to be inserted into a socket when the cover is closed and to prevent insertion of the plug into the socket when the cover is open.

A further object of the present invention is to provide an interlock device which includes a shutter member slidable to cover and to uncover a socket and includes a lost motion connection operably associated with the cover of the cabinet to effect allowance or prevention of plug insertion into the socket.

Additional advantages and features of the present invention will become apparent and fully understood from a reading of the following description taken together with the annexed drawing.

DESCRIPTION OF THE PREFERRED EMBODIMENT

Figure 1:
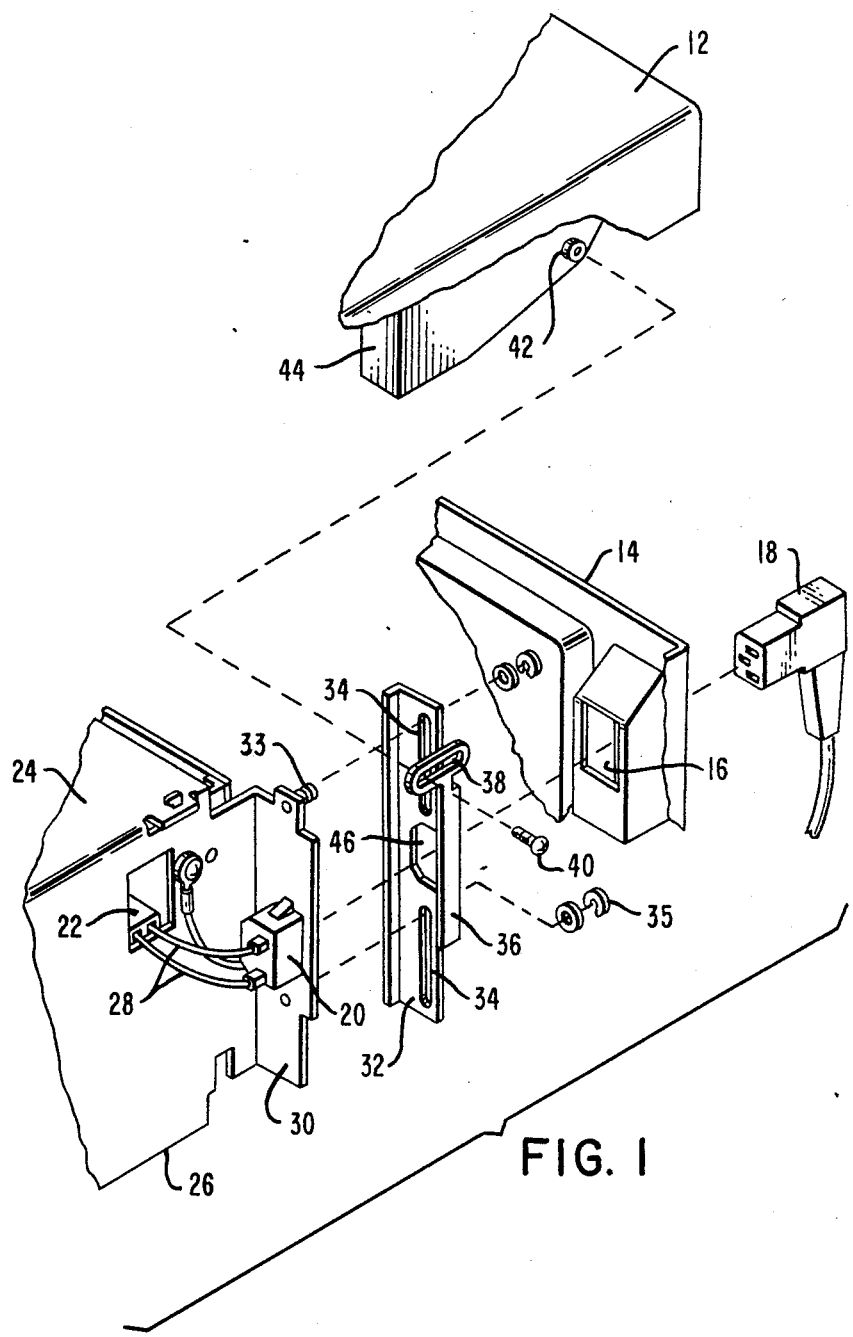
FIG. 1 is an exploded perspective view showing the state or position of the interlock device when the cover for the cabinet is in the closed position.
Figure 2:
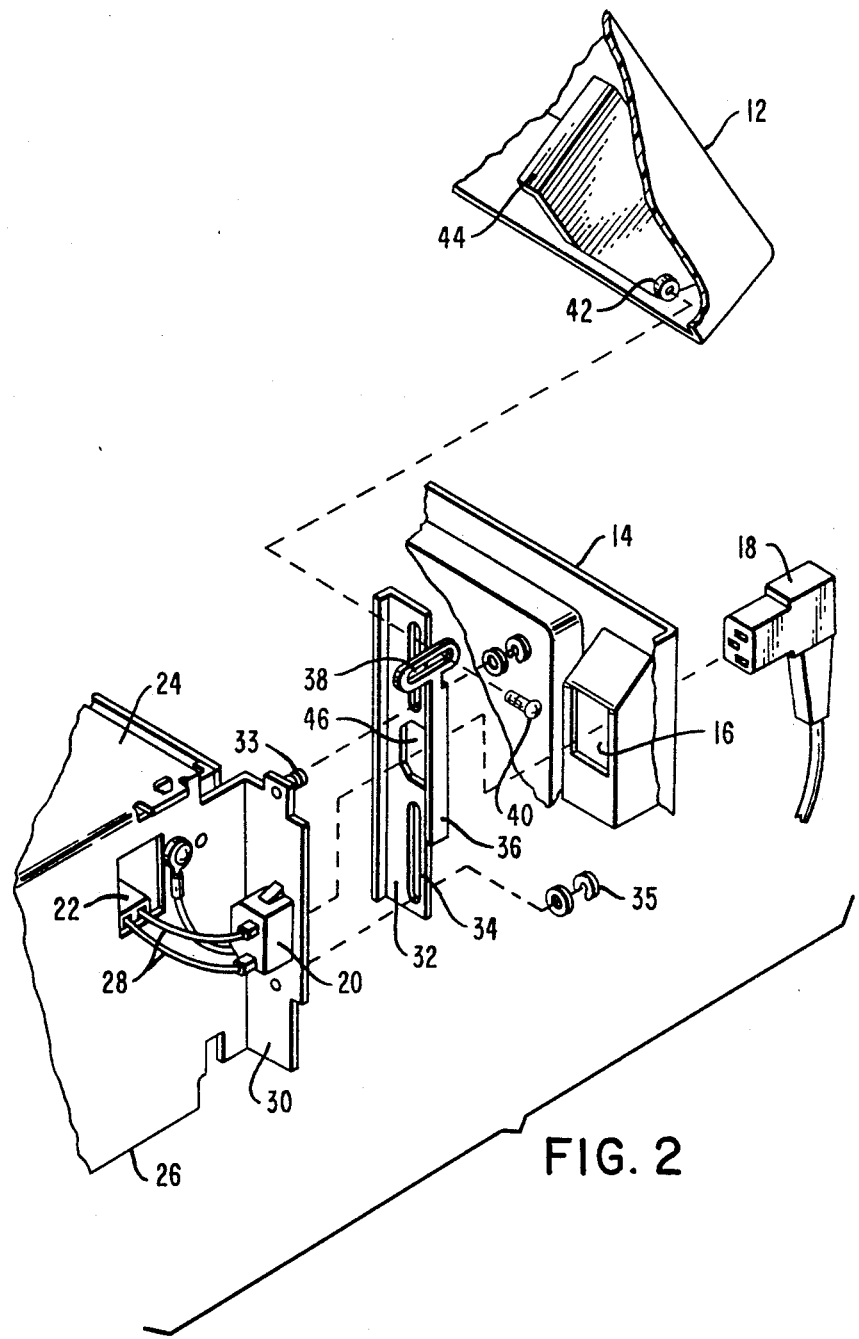
FIG. 2 is an exploded perspective view showing the state or position of the interlock device when the cover is in the open position.

FIG. 1 is an exploded perspective view showing a portion of an upper cabinet or cover 12 in the closed position and FIG. 2 is an exploded perspective view showing the portion of the upper cabinet or cover 12 in the open position. The upper cabinet portion or cover 12 is connected to a lower cabinet or portion 14 of the lower cabinet by means of a plastic hinge (not shown) or the like in an arrangement to enable freely opening and closing of the cover 12. On a rear wall of the lower cabinet portion 14, there is provided a plug insert port 16 through which is inserted a power source plug 18. A socket or receptacle 20 is provided within the lower cabinet portion 14 and power is supplied to a power source board 22 and to a circuit board 24 within a frame member or chassis 26 by means of wiring 28. The socket 20 is mounted on a member in the form of an L-shaped bracket 30 which is secured to and projects from the chassis 26.

A shutter member 32 is provided between the L-shaped projecting bracket or member 30 and the plug insert port 16 in the portion 14 of the lower cabinet. The shutter member 32 is formed in the shape of an angle to fit the L-shaped bracket 30. The shutter member 32 is supported by two studs, as 33, which are provided on upper and lower portions of the L-shaped projecting member 30 and engage with elongated slots, as 34, so as to enable reciprocating movement of the shutter member 32 in the vertical direction. Suitable clips, as 35, are used to retain the shutter member 32 on the studs 33. A side element 36, generally in the shape of a T, is secured to the shutter member 32 and includes an elongated slot 38 extending in a horizontal direction. The elongated slot or guide hole 38 is provided in an upper portion of the side element 36 and receives a stud 40 which is connected or screwed into a hub 42 provided on an L-shaped plate 44 which is attached to the upper cabinet portion or cover 12. The stud 40 is brought into engagement with and operates in the guide hole 38, so that the shutter member 32 slidably moves in the vertical direction in response to and in accordance with the opening and closing of the cover or upper cabinet portion 12. The shutter member 32 has an opening 46 which is provided so as to be in opposition to the front face of the socket 20 when the upper cabinet portion or cover 12 is closed (FIG. 1). The elongated slot 38-stud 40 combination constitutes and operates as a lost motion connection due to yielding or looseness of the parts.

As shown in FIG. 1, when the upper cabinet portion or cover 12 is in the closed position, the shutter member 32 is in a lower position and the opening 46 is opposite the socket 20. As noted by the path line, the power source plug 18 can be readily inserted through the plug insert port 16, passing through the opening 46 and into the socket 20. In the power source plug 18 inserted position, the power source plug 18 is in the opening 46 so that any vertical reciprocal movement of the shutter member 32 is avoided and hence the upper cabinet portion or cover 12 cannot be opened.

When the power source plug 18 is pulled out or removed from the socket 20, the shutter member 32 can move in the vertical direction and hence the upper cabinet portion or cover 12 can be opened. When the upper cabinet portion 12 is opened, the shutter member 32 is lifted upward by the stud 40 which projects through the slot 38 and is secured in the hub 42 on the L-shaped plate 44 in the upper cabinet portion 12. As noted by the path line in each of FIGS. 1 and 2, the stud 40 moves freely from one end to the other end of the slot 38 in the operation of the cover 12.

As shown in FIG. 2, in the open position of the upper cabinet portion or cover 12, the opening 46 in the shutter member 32 is displaced to an upper position so that the front face of the socket 20 is closed by the lower portion of the shutter member 32 and hence the power source plug 18 cannot be inserted into the socket 20.

As described above, according to the present invention, the passage of the plug 18 is controlled by a simple structure wherein the opening of the upper cabinet portion or cover 12 is prevented by reason of the plug 18 being inserted into the socket 20. On the other hand, when the upper cabinet portion or cover 12 is open, the power source plug 18 cannot be inserted into the socket 20 so that the power supply into the machine is cut off. As a result, an electric shock can be prevented even when one touches the power source board 22 within the chassis 26 and operator handling of the circuit board 24 causes no breakdown of circuit elements.

The interlock device includes the opening 46 which permits the power source plug 18 to be inserted therethrough into a business machine such as a cash register or the like and wherein a shutter member 32 opens and closes the opening 46 in the operation of opening and closing the cover 12 of the machine. When the cover 12 is closed, the power source plug 18 can be readily inserted through the opening 46 (FIG. 1). When the cover 12 is open, the front face of the socket 20 is closed by the shutter member 32 to avoid or prevent insertion of the power source plug 18 (FIG. 2). When the power source plug 18 is inserted through the insert port 16, through the opening 46 and into the socket 20, the plug 18 engages with the shutter member 32 to prevent opening of the cover 12. In this regard, the port 16 and the opening 46 are shaped to accommodate the plug 18. The lost motion connection (slot 38-stud 40) enables the shutter member 32 operation upon opening and closing action of the cover 12.

It is thus seen that herein shown and described is an interlock device for a business machine wherein the cover opening and closing operation is coupled through a lost motion connection to a shutter member which allows or prevents insertion of the power source plug into the socket or receptacle. The present invention enables the accomplishment of the objects and advantages mentioned above, and while a preferred embodiment of the invention has been disclosed herein, variations thereof may occur to those skilled in the art. It is contemplated that all such variations and modifications not departing from the spirit and scope of the invention hereof are to be construed in accordance with the following claims.

What is claimed is:

1. An interlock device for a cabinet, said interlock device comprising
    an openable-closable cover for the cabinet,
    a frame member in said cabinet,
    a socket supported from said frame member and adapted to receive a power source plug, and
    a shutter member coupled to said frame member and slidable in one straight-line direction and in the opposite straight-line direction relative to said socket and formed so as to allow or to prevent access thereto, said shutter member having an element fixed thereto and said element and cover being operably associated and including a slotted lost motion connection, said shutter member being constructed to move in the one direction when said cover is closed to allow said plug to be inserted into said socket and to move in the opposite direction when said cover is open to prevent insertion of said plug into said socket, and said plug being constructed to engage with said shutter member to prevent opening of said cover when said plug is inserted into said socket.

2. An interlock device for a cabinet, said interlock device comprising an openable-closable cover for the cabinet,
a frame member in said cabinet,
a socket supported from said frame member and adapted to receive a power source plug, and
a shutter member slidable relative to said socket and formed so as to allow or to prevent access thereto, said shutter member defining an opening formed therein to accommodate and to allow said plug to pass therethrough and into said socket, said shutter member having an element fixed thereto and said element and cover being operably associated and including a lost motion connection, said shutter member being constructed to move in one direction when said cover is closed to allow said plug to be inserted into said socket and to move in the opposite direction when said cover is open to prevent insertion of said plug into said socket, said said plug being constructed to engage with said shutter member to prevent opening of said cover when said plug is inserted into said socket.

3. An interlock device for a cabinet, said interlock device comprising an openable-closable cover for the cabinet,
a frame member in said cabinet, a socket supported from said frame member and adapted to receive a power source plug, and
a shutter member slidable relative to said socket and formed so as to allow or to prevent access thereto, said shutter member including a plurality of elongated openings and said frame member including stud means operable in said elongated openings permitting slidable operation of said shutter member in relation to said frame member, said shutter member having an element fixed thereto and said element and cover being operably associated and including a lost motion connection, said shutter member being constructed to move in one direction when said cover is closed to allow said plug to be inserted into said socket and to move in the opposite direction when said cover is open to prevent insertion of said plug into said socket, and said plug being constructed to engage with said shutter member to prevent opening of said cover when said plug is inserted into said socket.

4. The interlock device of claim 1 wherein said cabinet includes a plug insert port therein permitting passage of said plug therethrough and into said socket when said shutter member is moved in said one direction and said shutter member blocking passage of said plug into said socket when said shutter member is moved in said opposite direction.

5. An interlock device for a cabinet, said interlock device comprising an openable-closable cover for the cabinet,
a frame member in said cabinet,
a socket supported from said frame member and adapted to receive a power source plug, and
a shutter member slidable relative to said socket and formed so as to allow or to prevent access thereto, said shutter member having an element fixed thereto and said element and cover being operably associated and including a lost motion connection, said lost motion connection comprising an elongated opening in said element and said cover including a stud operable in and along said elongated opening upon opening and closing said cover, said shutter member being constructed to move in one direction when said cover is closed to allow said plug to be inserted into said socket and to move in the opposite direction when said cover is open to prevent insertion of said plug into said socket, and said plug being constructed to engage with said shutter member to prevent opening of said cover when said plug is inserted into said socket.

6. In a business machine having a cabinet and a cover therefor, a power source plug and a socket for receiving said plug, the improvement comprising an interlock device for allowing insertion of said plug into said socket when said cover is in the closed position and for preventing insertion of said plug when said cover is in the open position, said interlock device including a shutter member coupled to said cabinet and slidable in one straight-line direction to uncover said socket and in the opposite straight-line direction to cover said socket, an element fixed to the shutter member, and said element and cover being operably associated and constituting a slotted lost motion connection between the cover and the shutter member for allowing insertion or for preventing insertion of said plug into said socket dependent upon the position of said cover.

7. In a business machine having a cabinet and a cover therefor, a power source plug and a socket for receiving said plug, the improvement comprising an interlock device for allowing insertion of said plug into said socket when said cover is in the closed position and for preventing insertion of said plug when said cover is in the open position, said interlock device including a shutter member coupled to said cabinet and slidable in one direction and in the opposite direction, said shutter member defining an opening formed therein to accommodate and to allow said plug to pass therethrough and into said socket, an element fixed to the shutter member, and said element and cover being operably associated and constituting a lost motion connection between the cover and the shutter member for allowing insertion or for preventing insertion of said plug into said socket dependent upon the position of said cover.

8. In a business machine having a cabinet and a cover therefor, a power source plug and a socket for receiving said plug, the improvement comprising an interlock device for allowing insertion of said plug into said socket when said cover is in the closed position and for preventing insertion of said plug when said cover is in the open position, said interlock device including a shutter member coupled to said cabinet and slidable in one direction and in the opposite direction, said shutter member including a plurality of elongated openings and said cabinet including stud means operable in said elongated openings permitting slidable operation of said shutter member in relation to said cabinet, an element fixed to the shutter member, and said element and cover being operably associated and constituting a lost motion connection between the cover and the shutter member for allowing insertion or for preventing insertion of said plug into said socket dependent upon the position of said cover.

9. In a business machine having a cabinet and a cover therefor, a power source plug and a socket for receiving said plug, the improvement comprising an interlock device for allowing insertion of said plug into said socket when said cover is in the closed position and for preventing insertion of said plug when said cover is in the open position, said interlock device including a shutter member coupled to said cabinet and slidable in one direction and in the opposite direction, an element fixed to the shutter member, and said element and cover being operably associated and constituting a lost motion connection between the cover and the shutter member for allowing insertion or for preventing insertion of said plug into said socket dependent upon the position of said cover, said lost motion connection comprising an elongated opening in said element and said cover including a stud operable in and along said elongated opening upon opening and closing said cover.

10. An interlock device for a business machine, said interlock device comprising a cabinet and a cover therefor, a power source plug and a receptacle secured to said cabinet and adapted to receive said power source plug, said interlock device further comprising a shutter member slidably coupled to said cabinet and positioned adjacent the face of the receptacle and slidable in one straight-line direction to cover the face of the receptacle and to prevent insertion of said power source plug into said receptacle when said cover is in the open position, said shutter member being slidable in the opposite straight-line direction to uncover the face of the receptacle and to permit insertion of said power source plug into said receptacle when said cover is in the closed position, and a side element secured to said shutter member and operably associated with said cover to provide a slotted lost motion connection between said element and said cover for controlling the position of said shutter member dependent upon the opening and closing of said cover.

11. An interlock device for a business machine, said interlock device comprising a cabinet and a cover therefor, a power source plug and a receptacle secured to said cabinet and adapted to receive said power source plug, said interlock device further comprising a shutter member slidably coupled to said cabinet and positioned adjacent the face of the receptacle and slidable in one direction to cover the face of the receptacle and to prevent insertion of said power source plug into said receptacle when said cover is in the open position, said shutter member being slidable in the opposite direction to uncover the face of the receptacle and to permit insertion of said power source plug into said receptacle when said cover is in the closed position, said shutter member defining an opening formed therein to accommodate and to be engageable with said power source plug to prevent opening of said cover when said plug is inserted into said receptacle, and a side element secured to said shutter member and operably associated with said cover to provide a lost motion connection between said element and said cover for controlling the position of said shutter member dependent upon the opening and closing of said cover.

12. An interlock device for a business machine, said interlock device comprising a cabinet and a cover therefor, a power source plug and a receptacle secured to said cabinet and adapted to receive said power source plug, said interlock device further comprising a shutter member slidably coupled to said cabinet and positioned adjacent the face of the receptacle and slidable in one direction to cover the face of the receptacle and to prevent insertion of said power source plug into said receptacle when said cover is in the open position, said shutter member being slidable in the opposite direction to uncover the face of the receptacle and to permit insertion of said power source plug into said receptacle when said cover is in the closed position, said lost motion connection comprising an elongated opening in said element oriented in a direction normal to the direction of slidable movement of said shutter member and said cover including a stud operable in and along said elongated opening upon opening and closing said cover, and a side element secured to said shutter member and operably associated with said cover to provide a lost motion connection between said element and said cover for controlling the position of said shutter member dependent upon the opening and closing of said cover.

* * * * *